No. 875,340. PATENTED DEC. 31, 1907.
W. C. FOWNES, Jr. & R. J. GARDNER.
SELF LUBRICATING WHEEL.
APPLICATION FILED MAY 28, 1907.
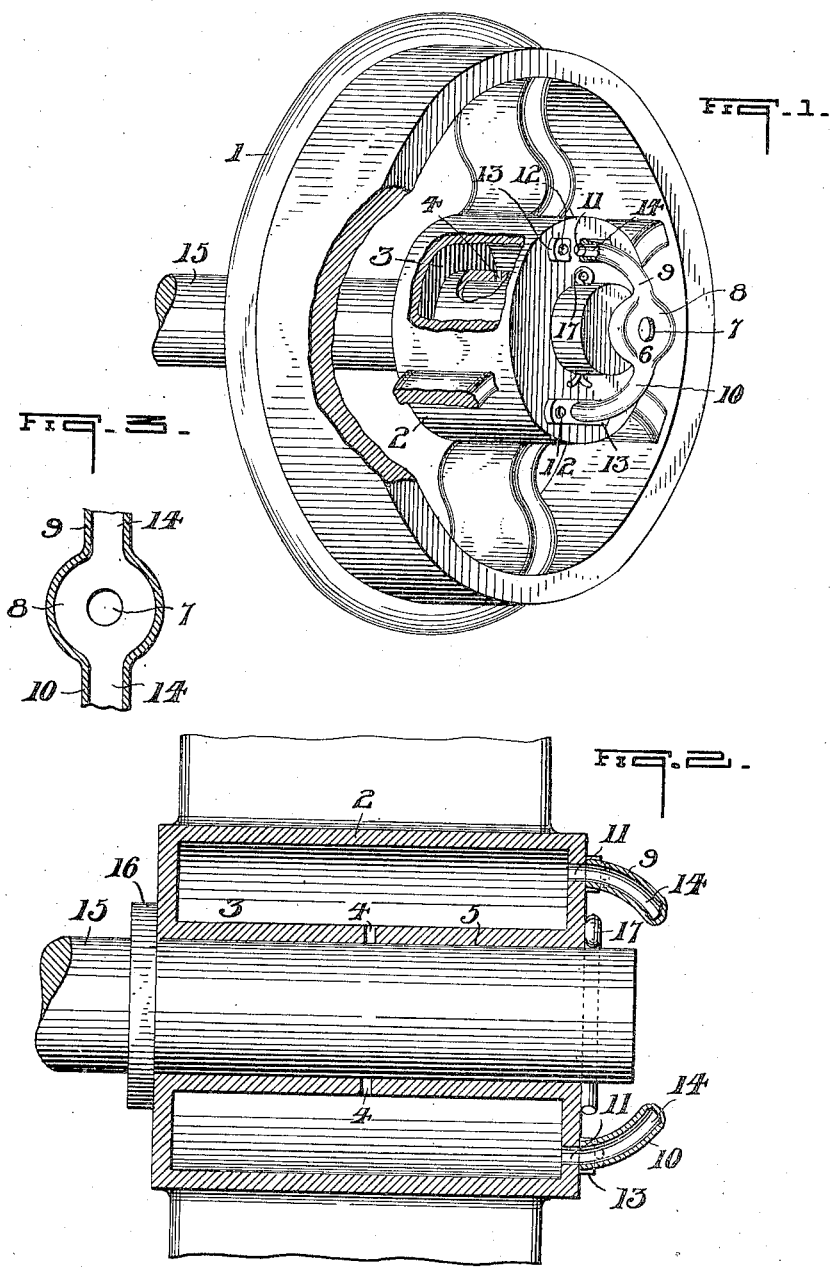
WITNESSES:
INVENTORS
W. C. Fownes, Jr.
R. J. Gardner
by F. N. Barber
ATTORNEY

UNITED STATES PATENT OFFICE.

WILLIAM C. FOWNES, JR., AND ROBERT J. GARDNER, OF PITTSBURG, PENNSYLVANIA, ASSIGNORS TO THE S. JARVIS ADAMS COMPANY, OF PITTSBURG, PENNSYLVANIA, A CORPORATION OF PENNSYLVANIA.

SELF-LUBRICATING WHEEL.

No. 875,340.　　　Specification of Letters Patent.　　　Patented Dec. 31, 1907.

Application filed May 28, 1907. Serial No. 376,184.

*To all whom it may concern:*

Be it known that we, WILLIAM C. FOWNES, Jr., and ROBERT J. GARDNER, citizens of the United States, both residing at Pittsburg, in the county of Allegheny and State of Pennsylvania, have invented or discovered new and useful Improvements in Self-Lubricating Wheels, of which the following is a specification.

Our invention relates particularly to means for feeding lubricant to the lubricant-chambers in the hubs of wheels, pulleys, or other rotatable devices.

Although the invention was primarily designed for mining-car wheels, it may be used with or form a part of other classes of wheels.

The objects of our invention are to provide a lubricant-feeding device of the character specified, into which lubricant can be introduced and in which it will be retained in all normal positions of the wheel; to provide an arch-shaped or radiately-armed lubricant-feeder which is preferably secured, either permanently or removably, to the outer end of the hub; to provide a lubricant-feeder of the class described which will make it possible to have the outer face of the hub beneath the said feeder machined or made smoother than an unfinished cast surface would be; to make it possible to apply a washer, if desired, between the hub and the linch-pin; to construct the lubricant-feeder so that at all times the end of the axle around the end of the hub will be exposed to view so that it can be ascertained whether the axle requires lubrication or the linch-pin has become broken or so worn as to be dangerous without removing the wheel or stopping the car; to make a projecting arch-shaped oiling device of cast steel or malleable iron, which is not commercially practical where the wheel and oiling device are cast integral; to provide a wheel which can be readily molded and cleaned of molding sand; to reduce the amount of defective wheels thrown into scrap to a minimum; to make a wheel of the character described which shall be strong in the walls or portions which are directly in contact with the axle so that the inner walls near the oiler end of the hub will not break; to prevent the waste of oil from the central inlet opening during the rotation of the wheel and still keep the oiling device of such a small cross section as not to interfere with any of the aforesaid objects; and to make a comparatively light and cheap device which will commend itself to those concerned in the manufacture and use of self-lubricating wheels.

Referring to the drawings, Figure 1 is a perspective of a wheel embodying our invention, portions being broken away; Fig. 2, a longitudinal section, a portion of the lubricant feeder being broken off; and Fig. 3, a section of a portion of the lubricant feeder.

Referring to the drawing, 1 is a wheel having the hub 2, which contains an annular lubricant-chamber 3. The chamber 3 surrounds the axial opening 5 in the wheel and has communication therewith by means of one or more openings 4, by which the lubricant is fed to the axle 15 in said opening 5. The hub 2 is prevented from sliding inwardly by the collar 16 on the axle and from sliding outwardly by the linch pin 17.

The numeral 6 designates our lubricant-feeding device as a whole, which is a narrow, hollow arch-shaped, radiately-armed device having its extremities preferably secured to the outer end of the hub 2 by means of the lag-bolts 12, extending through the feet 13 of the attachment and into the end wall of the hub. The feet 13 are diametrically opposite each other with respect to the axle-opening 5.

The arms are hollow from one end to the other, the openings in the feet or outer ends thereof communicating with the lubricant-chamber 3 by means of the holes 11 in the end wall of the hub. The arms are at their inner ends merged into an enlarged chamber 8 having in line with the axis of the wheel an inlet-opening 7, through which the nozzle of an oil-can may be inserted, even while the wheel is in motion. The inlet-opening 7 opens directly into the enlarged chamber 8 at the junction of the arms 9 and 10. This chamber provides pockets or spaces extending at right angles from the inlet, into which pockets or spaces the lubricant will be retained when fed thereinto when the arms are horizontal, or through which lubricant may pass from one arm to the other without any waste through the inlet 7. While the wheel is standing with one arm 9 or 10 down, this arm will fill the lubricant to the level of the lubricant in the chamber 3. If the wheel be rotated so that the said arm be inclined above the axle the lubricant will by reason of the chamber 8 pass around the inlet-opening 7 without waste. This makes it possible for us to reduce the diameter of the arms 9 and 10 very materially so that the view of the oiler-boy or inspector will not be obstructed so much as it would be if the arms were of greater diameter; besides if the arms were of the same diameter as the distance across the oiling device at the inlet 7, the liability of oil escaping through the inlet 7 when the wheel is rotated as described, would not in the least be avoided, as the upper arm would pour the oil therein past the inlet 7 the full diameter of the passage in the arm, the oil necessarily being higher than, or flowing in line with, the inlet.

We make the passage 14 in the arms 9 and 10 small so that as little lubricant as possible will pass toward the junction of the said arms but sufficiently large to permit the lubricant to flow freely along the arms to the chamber 3. The passage 14 is sufficiently smaller than the chamber 8 to prevent any of the lubricant which passes from one arm to the other through said chamber from escaping through the inlet 7. The cross-section of the chamber 8 at each side of the inlet 7 should, therefore, be equal to or greater than that of the passage 14 in the arms 9 and 10. The oil is retained as efficiently by having this very narrow arch with the enlarged central opening as it could possibly be by covering the entire end of the hub by a double-walled cap, as has been done heretofore.

The making of the oiling device very narrow or of small diameter enables it to be ascertained at once whether the axle is dry or sufficiently lubricated, and this without stopping the cars. So far as we are aware, all center oiling wheels with caps do not permit it to be determined whether the axle is dry or not while the wheel is in motion; in fact, they do not permit this to be determined without the removal of the wheel from the axle or of some plug or the like from the hub.

With our invention the outer end of the hub beneath the arms 9 and 10 can be machined or made of a surface smooth enough to make a suitable bearing for the linch-pin or a washer between the pin and the hub. So far as we are aware, in all existing oiling devices with caps having a mere tunnel through which the linch-pin can be placed, the bearing for the linch-pin can not be machined or made of smooth material as the parts are all cast integral. It is clear that an unfinished cast-iron surface would not make a satisfactory bearing for the linch-pin, as it would be cut away rapidly.

With our device, we may apply a washer between the end of the hub and the linch-pin, which it is impossible to do with any cast-iron wheel and still have sufficient metal for the cap to make it strong enough to withstand the rough usage to which mining car wheels are subjected. In case the linch-pin becomes broken, it can be readily seen without removing the wheel or even stopping the same. In case the linch-pin be concealed, as by a cap, the wheel might come off at a frog and switch and cause a serious wreck.

Our wheel can be easily made as the difficulties of making and supporting complicated cores are done away with, and the production of a large per cent, sometimes amounting to 60 or 65 per cent, of scrap is avoided. It will be seen that the end wall of the hub serves to solidly connect the two annular walls of the lubricant chambers 3 together except at the very insignificant openings 11.

It is evident that our structure could not be duplicated in an integral cast structure, because the metal, when it strikes the cast-iron chill in which it is made, would chill and refuse to flow in the openings so small and thin as the arms 9 and 10. Besides, such a structure would be too fragile to be of long service, even if made.

In case our improvement is secured to the hub by bolts or other removable means, it will be very convenient and at the same time comparatively inexpensive to replace a broken lubricant-feeder by a new one, whereas, if the lubricant-feeder is integral with the wheel and becomes broken, it would be necessary to replace the whole wheel with a new one.

Our attachment is simple, light, efficient, and inexpensive and when constructed as shown is applied to a hollow hub merely by providing the holes 11 and the necessary holes for the securing-bolts or other fastening devices. Our attachment is a very narrow device and at all times permits an unobstructed view of the end of the axle, so that it may be readily ascertained whether the axle is properly lubricated or not. It is in no sense a cap or covering for the hub, as the latter has preferably a covering of its own.

We claim—

1. The combination of an axle, a hub thereon having a lubricating chamber therein, a hub-fastening device carried by the axle, a plurality of hollow arms on said hub, the arms meeting opposite the end of the axle where a central inlet communicating with the passages in said arms is provided, and means for securing said arms to the hub, the outer face of the hub being sufficiently clear of obstructions and the said arms being sufficiently narrow to permit at substantially all times a view of the axle where it emerges from the hub.

2. The combination of an axle, a hub thereon having a lubricating chamber therein, and a substantially plane outer face, a hub-fastening device carried by the axle, a plurality of hollow arms on the said hub, the said arms meeting opposite the end of the axle where a central inlet communicating with the passages in said arms is provided, and means for securing said arms to the hub, the said arms being sufficiently narrow to permit at substantially all times a view of the axle where it emerges from the hub.

3. The combination of an axle, a hub thereon having a lubricating chamber therein, a hub-fastening device carried by the axle, a plurality of hollow arms on said hub, the arms meeting opposite the end of the axle where a central inlet communicating with the passages in said arms is provided, and detachable means for securing said arms to the hub, the outer face of the hub being sufficiently clear of obstructions and the said arms being sufficiently narrow to permit at substantially all times a view of the axle where it emerges from the hub.

4. The combination of an axle, a hub thereon having a lubricating chamber therein, a hub-fastening device carried by the axle, a plurality of hollow arms on said hub, the arms meeting in a hollow enlargement opposite the end of the axle where a central inlet communicating with the passages in said arms is provided, and means for securing said arms to the hub, the outer face of the hub being sufficiently clear of obstructions and the said arms being sufficiently narrow to permit at substantially all times a view of the axle where it emerges from the hub.

5. The combination of an axle, a hub thereon having a lubricating chamber therein, a hub-fastening device carried by the axle, a plurality of hollow arms on said hub, the arms meeting in a hollow enlargement opposite the end of the axle where a central inlet communicating with the passages in said arms is provided, and means for securing said arms to the hub, the outer face of the hub being sufficiently clear of obstructions and the said arms being sufficiently narrow to permit at substantially all times a view of the axle where it emerges from the hub, the cross-section of the passages in the said enlargement each side of the inlet at least equaling that of the passage in one of the arms.

Signed at Pittsburg, Pa., this 27th day of May 1907.

WM. C. FOWNES, Jr.
ROBERT J. GARDNER.

Witnesses:
F. N. BARBER,
C. E. EGGERS.